United States Patent
Berndl et al.

(10) Patent No.: US 12,442,342 B2
(45) Date of Patent: Oct. 14, 2025

(54) COMPENSATION CONTROLLER FOR CONTROLLING THE BOOST PRESSURE FOR CHARGED INTERNAL COMBUSTION ENGINES

(71) Applicant: Bayerische Motoren Werke Aktiengesellschaft, Munich (DE)

(72) Inventors: Georg Berndl, Seitenstetten (AT); Thomas Passenbrunner, Dietach (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 47 days.

(21) Appl. No.: 18/684,616

(22) PCT Filed: Aug. 23, 2022

(86) PCT No.: PCT/EP2022/073433
§ 371 (c)(1),
(2) Date: Feb. 16, 2024

(87) PCT Pub. No.: WO2023/052003
PCT Pub. Date: Apr. 6, 2023

(65) Prior Publication Data
US 2025/0223933 A1    Jul. 10, 2025

(30) Foreign Application Priority Data
Sep. 29, 2021    (DE) ............... 10 2021 125 259.8

(51) Int. Cl.
*G06G 7/70* (2006.01)
*F02D 23/00* (2006.01)
*F02D 41/14* (2006.01)
*F02D 41/24* (2006.01)

(52) U.S. Cl.
CPC ............. *F02D 41/14* (2013.01); *F02D 23/00* (2013.01); *F02D 41/24* (2013.01)

(58) Field of Classification Search
CPC ......... F02D 2200/0402; F02D 41/1448; F02D 2041/1409; F02D 2041/1422;
(Continued)

(56) References Cited

U.S. PATENT DOCUMENTS 11,015,538 B2 * 5/2021 Gebauer ............. F02D 41/0007
11,339,711 B2 * 5/2022 Heinken ............. F02D 41/1401
(Continued)

FOREIGN PATENT DOCUMENTS

| DE | 11 2006 003 091 T5 | 9/2008 |
| DE | 10 2010 033 313 A1 | 4/2011 |
| DE | 10 2016 107 870 A1 | 11/2016 |
| GB |      2501922 A     | 11/2013 |

OTHER PUBLICATIONS

International Search Report (PCT/ISA/210) issued in PCT Application No. PCT/EP2022/073433 dated Dec. 15, 2022 with English translation (5 pages).
(Continued)

*Primary Examiner* — Logan M Kraft
*Assistant Examiner* — James J Kim
(74) *Attorney, Agent, or Firm* — Crowell & Moring LLP

(57) ABSTRACT

An apparatus associated with compensating boost pressure in a charged internal combustion engine includes an electronic control unit. The electronic control unit has a correction module. The electronic control module is configured to cooperate with at least two actuators that differ in terms of system gain. The correction module is configured such that firstly at least one controller parameter is smoothed within a defined transition range. The correction module is configured such that secondly the integrative component is transferred with a correction value corresponding to a ratio of or the difference between the system gains when the control passes from a first of the at least two actuators with the first (Continued)

system gain to a second at least two actuators with the second system gain that differs from the first.

3 Claims, 4 Drawing Sheets

(58) Field of Classification Search
CPC .... F02D 41/1447; F02D 41/145; F02B 37/22; F02M 26/10; F02M 26/05
USPC ........................................................ 701/102
See application file for complete search history.

(56) References Cited

U.S. PATENT DOCUMENTS

| | | |
|---|---|---|
| 2002/0103596 A1 | 8/2002 | Zhu et al. |
| 2011/0036086 A1* | 2/2011 | Liu .................... F02D 41/1401 60/602 |
| 2022/0170413 A1* | 6/2022 | Dixon ................ F02D 41/0007 |

OTHER PUBLICATIONS

German-language Written Opinion (PCT/ISA/237) issued in PCT Application No. PCT/EP2022/073433 dated Dec. 15, 2022 with English translation (9 pages).
German-language Search Report issued in German Application No. 10 2021 125 259.8 dated May 7, 2022 with partial English translation (9 pages).

* cited by examiner

COMPENSATION CONTROLLER FOR CONTROLLING THE BOOST PRESSURE FOR CHARGED INTERNAL COMBUSTION ENGINES

BACKGROUND AND SUMMARY

The disclosure relates to a compensation controller for an electronic control unit for controlling the boost pressure for charged internal combustion engines comprising at least two actuators.

Various controllers for controlling boost pressure for charged internal combustion engines comprising at least two actuators are already known.

One object of the present disclosure is to improve a controller for controlling boost pressure to the effect that, when switching over from one actuator to the other actuator, negative effects such as drops in boost pressure and associated fluctuations in traction force and jerks perceptible by the driver are avoided.

This and other objects are achieved by the features of the inventive controller disclosed herein. Advantageous developments of the disclosure form the subject matter of the present disclosure.

The disclosure relates to a compensation controller for an electronic control unit for controlling the boost pressure for charged internal combustion engines comprising at least two actuators that differ in terms of system gain or transfer behavior.

The control unit has a correction module so that at least one controller parameter is smoothed in a defined transition range, and the integrative component (for example the I component of a PI or PID controller) is transferred within a defined transition range with a correction value corresponding to the ratio of or the difference between the system gains.

The controller parameters are preferably smoothed within a defined transition range, and the integrative component is corrected at an initialization time point when the control is transferred from the first actuator to the second actuator when the first actuator is completely open.

The transition range therefore begins at an initialization time point when the control passes from the first actuator with a first system gain (in particular after the completely open position of the first actuator is reached) to the second actuator with a second system gain that differs from the first.

The disclosure is based on the following considerations:

In many technical systems, multiple actuators are used to achieve a target variable. For example, this is the case when multiple drive units are used at the same time in a vehicle to fulfill the driver's intention. Further examples can be found in the control of boost pressure for charged internal combustion engines, specifically in variants with multi-stage charging. Firstly, there are variants in which two different actuators, a turbocharger with a variable turbine geometry (also referred to as VTG for short) and a bypass valve (exhaust butterfly valve, also referred to as BV for short), are used at the high-pressure (HP) stage. Secondly, in topologies with a fixed HP stage, there is the possibility of directly incorporating the low pressure (LP) stage.

The target variable (for example, the target boost pressure) is then set using a common control system that uses multiple actuators. Often, all the actuators except for one are actuated, and the control is effected with a single actuator. Problems arise in a situation in which the actual control changes from one actuator to another actuator in order to achieve the target variable.

Irrespective of whether a model-based control or a control based on data and experiments is used, a compensation control must be added to compensate for model errors, faults, changes in the system owing to aging, etc. In many cases, this compensation control is a simple PI or PID controller.

Widely differing system gains when the different actuators are used are problematic from a control perspective. To achieve maximum performance, however, the compensation controller is designed to be as aggressive as possible. Different parameterizations of the compensation control are used for the different actuators, as a result of which there are sudden changes in the output of the compensation controller during the transition from one actuator to the other actuator. In the worst case, the control is then carried out at least briefly on the first actuator and then the control takes place again on the second actuator.

According to the prior art, an integral component (for example the I component of a PI controller) in the compensation controller that was "learned" on the first actuator is also transferred to the other actuator and leads to over- or undercompensation there, in particular when the actuators differ greatly in transfer behavior owing to different system gains. Furthermore, under some circumstances it takes a very long time until an integrative component with the parameterization of the compensation controller is "correctly learned" for another actuator. The control target is not achieved during this time.

The two above-described problems are solved according to the disclosure in principle in the following way:

The parameterization of the compensation control is smoothed before, after, or before and after the transition from one actuator to the other actuator, in particular within a defined transition range, so that there is no longer any sudden change in the output of the compensation controller. The integral component in the compensation controller is divided so that on the one hand the transition to the other actuator is retained and on the other hand the remaining integral component is scaled with the different gains or set to zero.

In other words, at least one controller parameter is smoothed in a defined transition range in an electronic control unit having the controller in order to prevent sudden changes in the correction value. Furthermore, when the control is to be transferred from the first actuator with the lower system gain (for example VTG at the HP stage) to the actuator with the higher system gain (for example bypass butterfly valve at the HP stage), the I component is corrected with the ratio of the (different) system gains. This correction value can for example be taken from a characteristic curve or a table, which can be determined empirically and stored in the control unit. However, it can also be present in the form of a factor in the control unit.

The control unit therefore contains according to the disclosure, in particular by means of corresponding software programming, a compensation controller having a correction module for adapting the controller parameters, and a scaling during the transfer of the integrative component to the difference in the system gain during the transfer of the control from one actuator to another actuator.

The disclosure can be used particularly advantageously in a first case during the transfer of the control from the VTG at the HP stage in a charged twin-turbocharger internal combustion engine (for example diesel engine) to the butterfly valve (bypass valve at the HP stage) and vice versa. Furthermore, the disclosure can also be used in a second case during the transfer of the control from the butterfly valve at the HP stage to the VTG at the LP stage in a charged internal combustion engine with a fixed HP stage in two-stage operation of the charging, and vice versa.

The disclosure is explained in more detail using the example of the first case, with reference to drawings. In the figures:

DETAILED DESCRIPTION OF THE DRAWINGS

Figure 1:
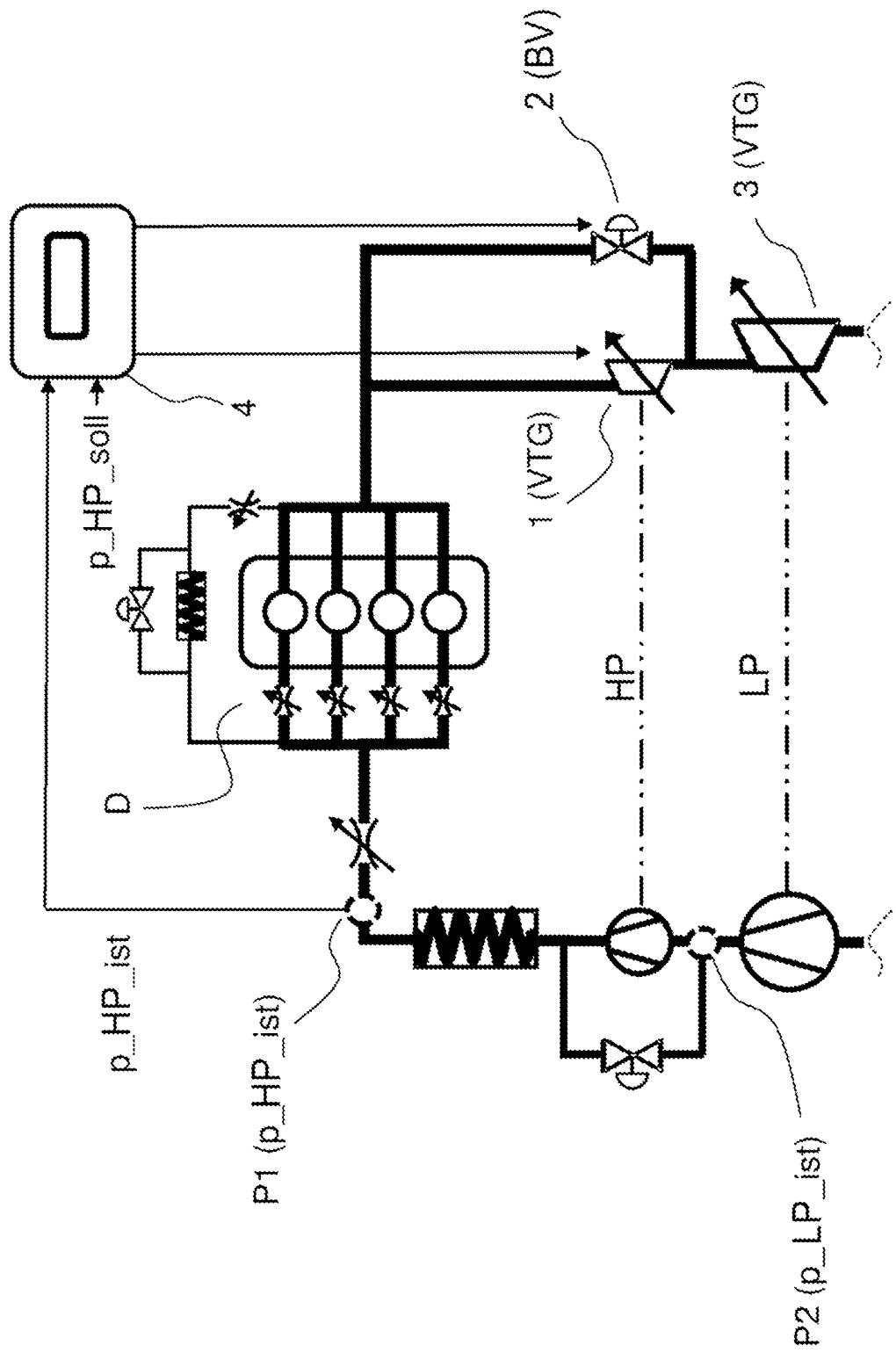
FIG. 1 shows a detail of components of a twin-charged internal combustion engine.

FIG. 1 shows a detail of the components of a twin-charged diesel engine D as an example of an internal combustion engine having a first turbocharger (including a first actuator 1) and an exhaust bypass butterfly valve (including a second actuator 2) in a high-pressure path HP stage and having a second turbocharger 3 in a low pressure path LP stage. At least the turbocharger in the high-pressure path has a variable turbine geometry (VTG actuator 1). The butterfly valve has a variable valve (BV actuator 2). Furthermore, the internal combustion engine D has, on the input side, a pressure sensor P1 for sensing the high pressure boost pressure p_HD_ist and optionally a pressure sensor P2 for sensing the pre-compression p_ND_ist.

The disclosure is explained below, as mentioned above, for a first case during transfer of the control from the VTG at the HP stage, that is, from the first (VTG) actuator 1, to the butterfly valve, that is, the second (BV) actuator 2.

The internal combustion engine D and in particular also the boost pressure is controlled by an electronic control unit 4. For example, the current high pressure boost pressure p_HD_ist is an input signal of the electronic control unit 4. In the electronic control unit 4, the setpoint high pressure boost pressure p_HD_soll is also specified as a reference variable of a controller, for example a model-based boost pressure controller to which a PI controller is added for compensation.

Figure 2:
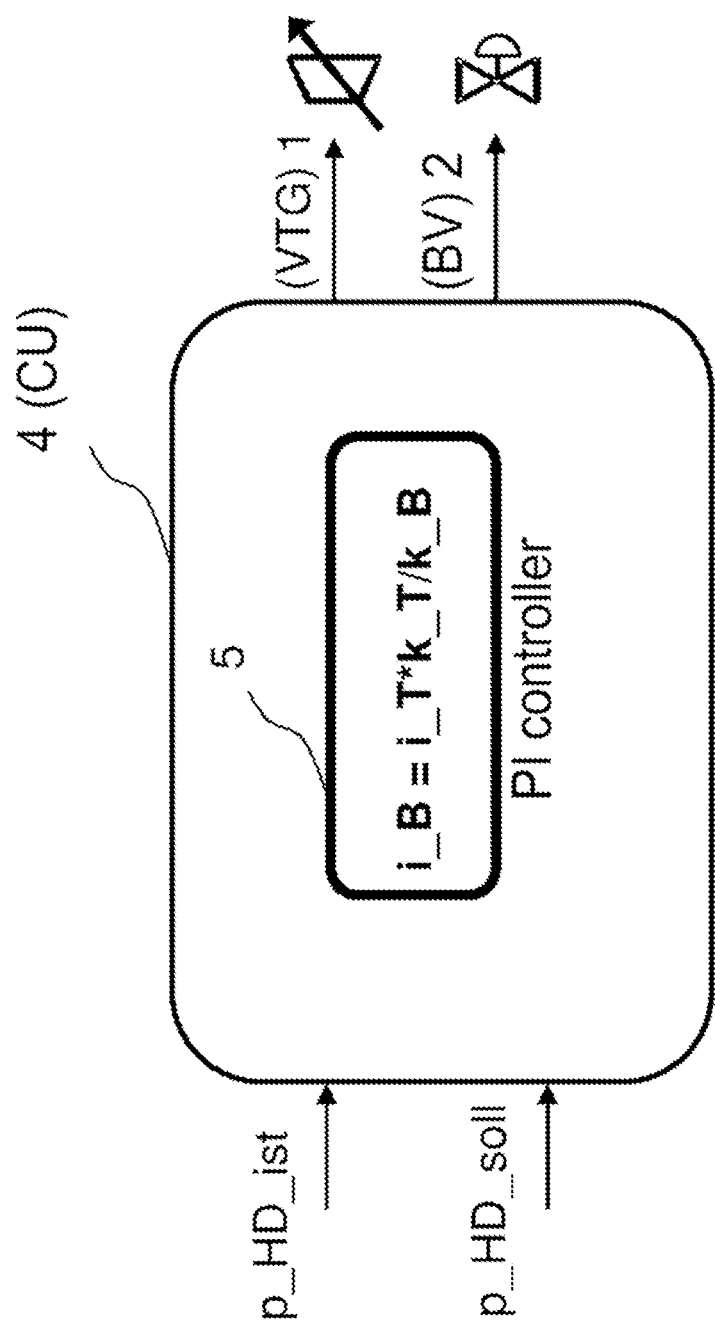
FIG. 2 shows an enlargement of the control unit with a correction module according to the disclosure.

FIG. 2 shows the control unit 4 in more detail. The control unit 4 contains a controller, in particular a compensation controller according to the disclosure with a correction module 5. Exemplary output signals of the control unit 4 are the actuation signals for the first actuator 1 (VTG) and the second actuator 2 (BV).

Figure 3:
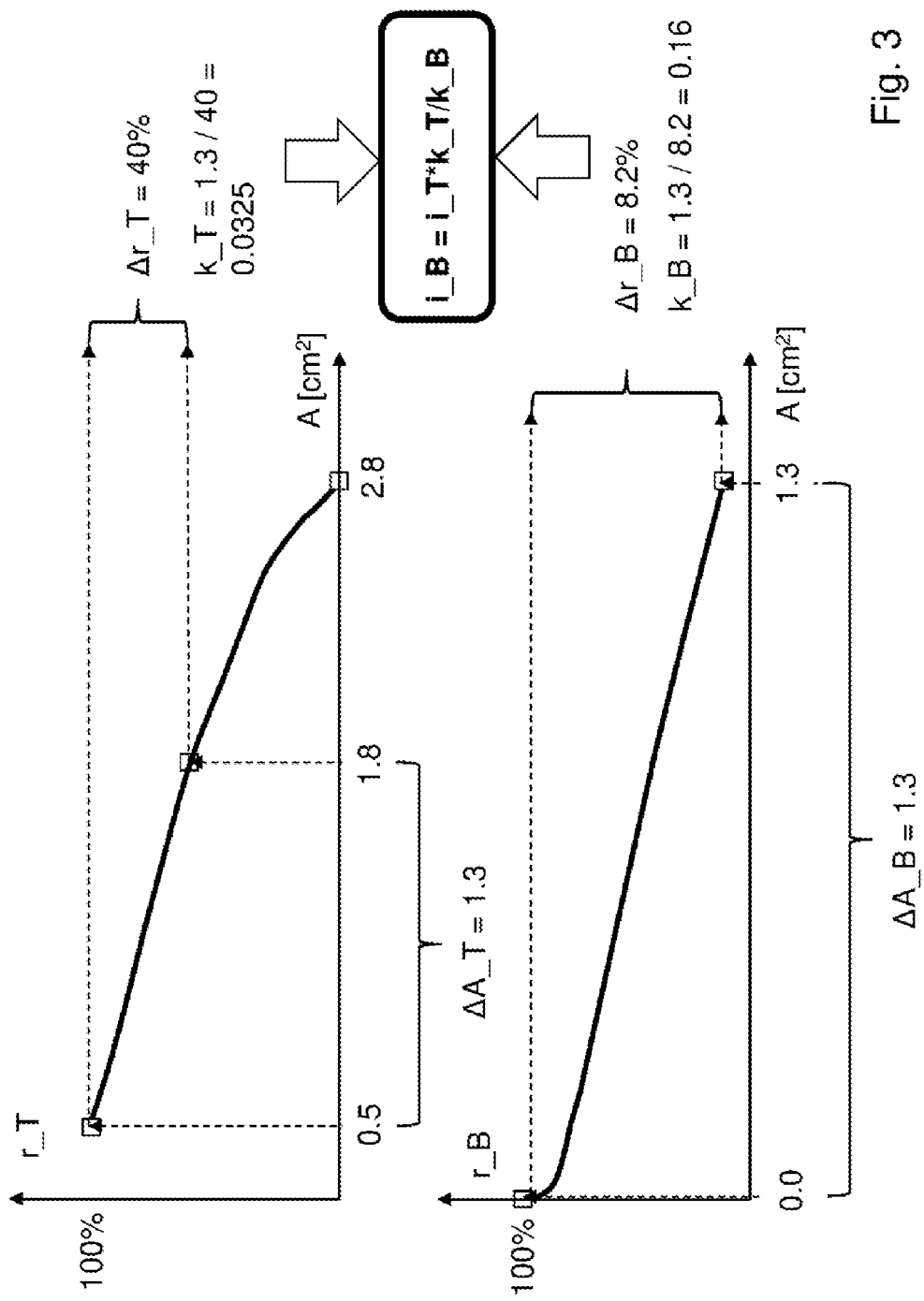
FIG. 3 shows a diagram of the system gain differences with ascertainment of the correction value.

The configuration (in particular programming) of the correction module 5 is explained in more detail in connection with FIG. 3. The VTG actuator 1 and the butterfly valve actuator 2 have different system gains. These are shown schematically by way of example in FIG. 3:

FIG. 3 shows the comparatively slow transfer behavior of the first actuator 1 at the top and the comparatively fast transfer behavior of the second actuator 2 at the bottom, using the dependence of the area A opened in each case on the respective adjustment position r_T and r_B (between 0% and 100%) of the first actuator 1 and of the second actuator 2.

The controller parameters to be smoothed and the correction of the I component are considered using FIG. 3.

The controller parameters are smoothed within a defined transition range B, and the I component is corrected at an initialization time point to when the control is transferred from the first actuator 1 to the second actuator 2 after r_t=0% is reached (that is, when the VTG is completely open).

For an area component AA to be changed of in this case 1.3 cm$^2$, for example, a position change Δr_T of 40% is necessary with the first actuator 1, and only a position change Δr_B of 8.2% is necessary with the second actuator 2. This difference in the system gain (gain factors from ΔA/Δr_T and ΔA/Δr_B) is formed by calculating the ratio of the gain factors k_T and k_B and is defined as a correction value for the I component i_T of the first actuator 1 to the I component i_B of the second actuator 2. In the correction module 5, the rule for the smoothed I component to control the second actuator 2 to be engaged thus results as follows:

$$I\_B = i\_T * k\_T / k\_B$$

Figure 4:
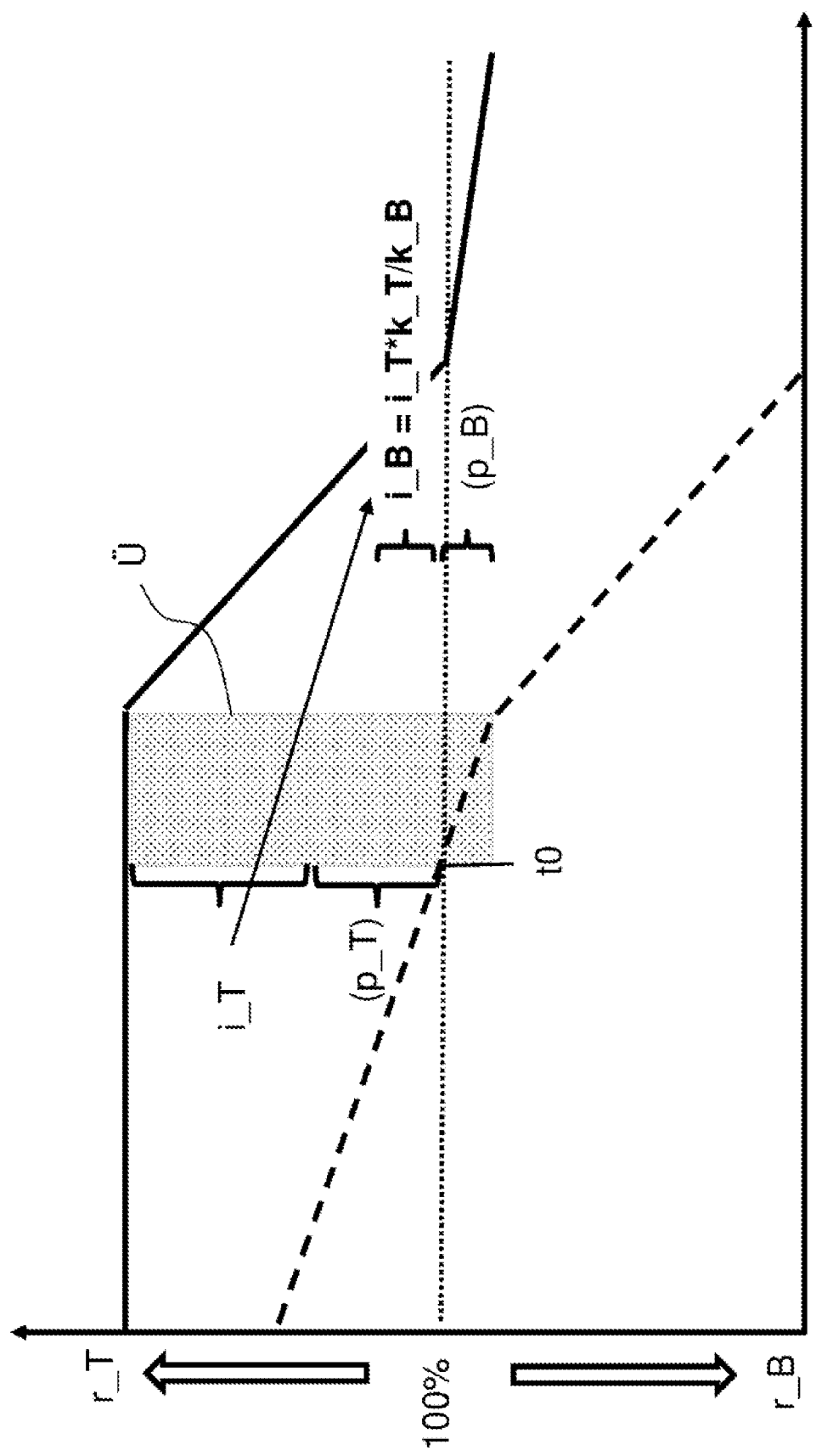
FIG. 4 shows a graph over time to illustrate the transition range.

FIG. 4 shows a graph over time to illustrate the transition range.

Final calculation example for an I component transfer during a controller transition to a "second actuator control".

An I component of for example i_T=10% is assumed for the first actuator 1. From this follows, in connection with the numbers assumed in FIG. 3: i_B (initial value)=i_T*k_T/k_B=2.03% as an allocation of the error at the HP stage.

The disclosure can also be applied analogously to the pressure control in the HP stage, for example.

What is claimed is:

1. An apparatus associated with compensating boost pressure in a charged internal combustion engine, comprising:
   an electronic control unit having a correction module, the electronic control module being configured to cooperate with at least two actuators, wherein a first of the at least two actuators having a first system gain, and a second of the at least two actuators having a second system gain that differs from the first system gain, wherein
   the correction module is configured such that firstly at least one controller parameter is smoothed within a defined transition range, and secondly an the integrative component of an adjustment position with respect to an opening area of a respective actuator is transferred with a correction value corresponding to a ratio of or the difference between the system gains when the control passes from the first of the at least two actuators with the first system gain to the second of the at least two actuators with the second system gain.

2. The apparatus according to claim 1, wherein the controller parameters are smoothed within a defined transition range, and the integrative component is corrected at an initialization time point when the control is transferred from the first actuator to the second actuator when the first actuator is completely open.

3. The apparatus according to claim 2, wherein the correction value is derived from a ratio of a value proportional to the system gain of the first actuator to a value proportional to the system gain of the second actuator.

* * * * *